May 30, 1939. C. J. GARRETT 2,160,584
FOLDING FISH LANDING NET
Filed April 25, 1938
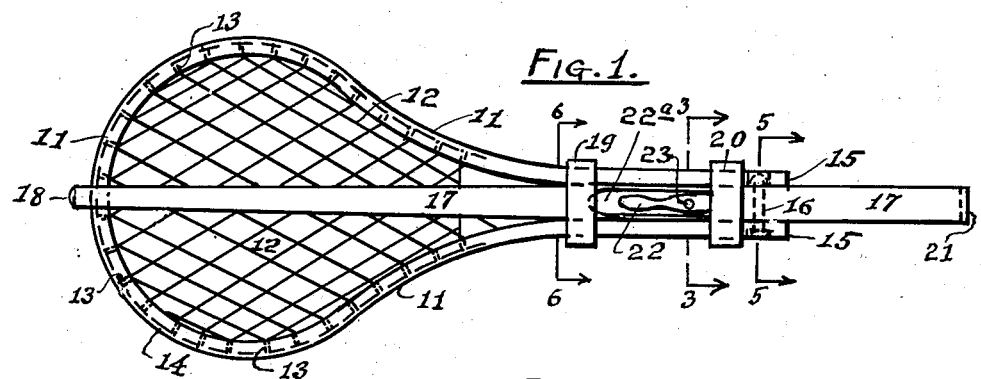
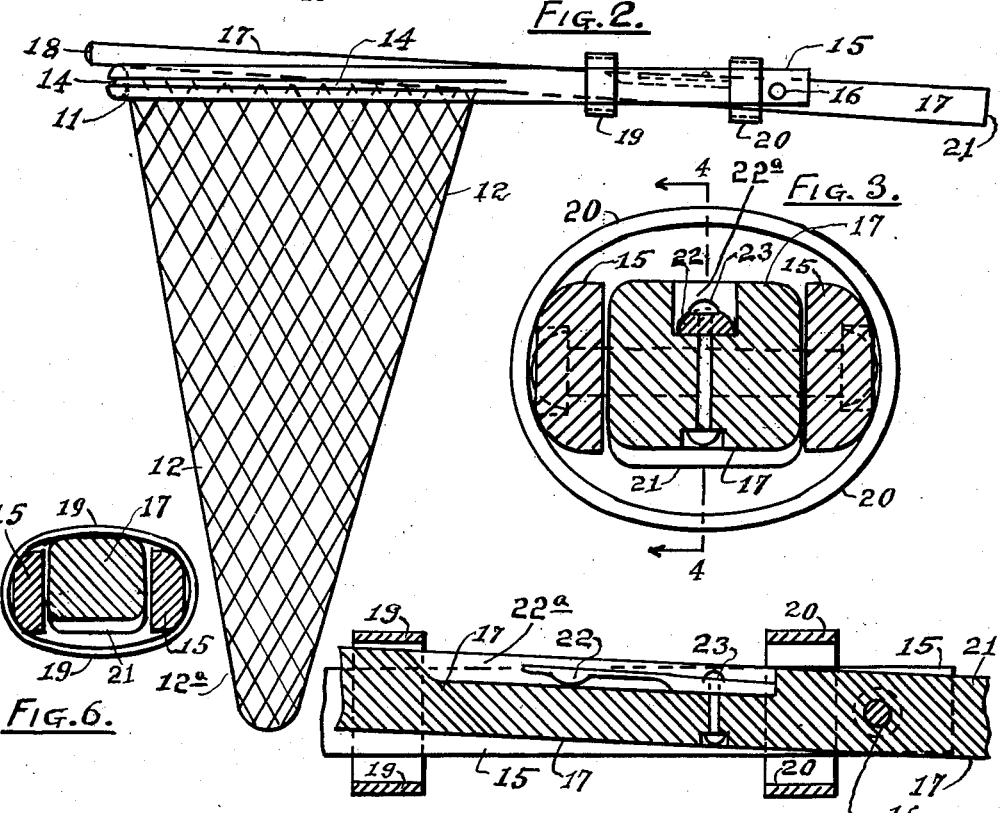
INVENTOR:
Charles J. Garrett
BY
Israel Benjamins,
ATTORNEY Patented May 30, 1939

2,160,584

UNITED STATES PATENT OFFICE 2,160,584

FOLDING FISH LANDING NET

Charles J. Garrett, Newport, Vt.

Application April 25, 1938, Serial No. 204,002

1 Claim. (Cl. 43—12)

My invention relates to improvements in a folding fish landing net, and it consists in the novel features which are hereinafter more fully described.

One of the objects of my invention is to produce an improved landing fish net which may be folded, thereby facilitating the carrying of the same and reducing the size of the space into which it may be packed.

Another object of my invention is to provide the said landing fish net with a pivotally connected handle bar and a removable means for holding said handle bar securely in position on said net when required.

A further object of my invention is to have said landing fish net and its accessories easy to assemble and to dismantle, also light in weight and strong and rigid when assembled.

A still other object of my invention is to prevent chafing or cutting of the net bag when my improved landing fish net contacts with other objects, such as the side of a boat or oar, and to have my landing fish net non-sinkable when dropped overboard by accident.

Another object of my invention is to provide the handle or some other part of my improved landing fish net with a clamp for securing the end of the net bag in position, to keep the same from flopping.

A further object of my invention is to have my improved landing fish net simple, durable and inexpensive.

Other objects and advantages will hereinafter appear.

I attain these objects by the landing fish net and the accessories thereof which are illustrated in the accompanying drawing or by any mechanical equivalents or obvious modifications of the same.

In the drawing Fig. 1 is a top plan view of my improved landing fish net which is shown as folded and with the clamp, which is hereinafter described, in position to receive the end of the fish net; and Fig. 2 is a side elevation of the same.

Fig. 3 is a section on the line 3—3 of Fig. 1, drawn to a larger scale.

Fig. 4 is a fragmentary detail view in section on the line 4—4 of Fig. 3, showing the clamp in elevation and placed in a position to allow the binding rings or bands which are hereinafter described, to pass thereover on to the handle bar and frame of the fish net.

Fig. 5 is a section on the line 5—5 of Fig. 1.

Fig. 4 is drawn to a larger scale than Figs. 1 and 2 and to a smaller scale than Fig. 3; Fig. 5 is drawn to the same scale as Fig. 3.

Fig. 6 is a section on the line 6—6 of Fig. 1, looking in the direction of the arrows, and drawn to a larger scale than Fig. 1.

Similar numerals refer to similar parts throughout the several views:

11 designates a hoop or frame of my landing fish net; the frame 11 has secured thereto the net bag 12 at the upper end of the latter; the cords 13 of the net pass through apertures 13 in the frame 11 which terminate in a groove 14 in the outer periphery of the frame 11; this protects the cords of the net bag or any part thereof from being worn or crushed.

The frame 11 is preferably made of wood and is part circular in shape and terminates in a pair of shafts 15 which are shown as pivotally connected by means of a pin 16 to a handle bar 17. A metal ferrule may be provided to encompass the pin 16 in its socket through said shafts 15 and bar 17.

The bar 17 is shown in Figs. 1 and 2 as folded up on the frame 11 and the end 18 of the bar 17 extends over and beyond the part of the frame 11 which is remote from the pin 16; the top of the bar 17 is in this way inclined to the plane of the frame 11, and allows an elliptical ring or band 19 which encompasses the shafts 15 and the part of said bar 17 which is placed therebetween to be wedged thereover.

By moving the ring or band 19 from right to left in Fig. 2 it will gradually be tightened on to said shafts 15 and bar 17.

The ring or band 19 serves to hold the shafts 15 with the bar 17 securely together.

An additional ring or band 20 is shown as encompassing the said shafts 15 and bar 17 at or near the pin 16; this ring 20 is to be moved into position over the heads of said pin 16 until it becomes securely wedged endwise thereover, thereby providing an additional means for securely holding together said bar 17 and said shafts 15.

The ring or band 20 may be similar to or identical with the ring or band 19.

When the fish net is to be unfolded or prepared for use the bands 19 and 20 are removed therefrom by pulling them in a direction from left to right in Fig. 2, and the bar 17 is then revolved around the pin 16 as an axis through an angle of nearly 180 degrees into the required position; the rings or bands 19 and 20 are then slipped over the bar 17, moved from right to left and placed over the said shafts 15 and the shorter end 21 of the bar 17 and wedged thereover endwise; the band 20 may then be wedged over the heads of the horizontal pin 16.

When the fish net 11—12 is being folded up, the net bag 12 thereof may be wound around the said shafts 15 and the end 12a thereof jammed between the said bar 17 and a resilient clamp 22 which may be made of bamboo or any other suitable material and is shown as placed in a groove 22a in the bar 17 and connected to the end 21 of the bar 17 by means of a rivet 23.

When the fish net is unfolded for use the clamp 22 may remain in place in the groove 22a, and the rings 19 and 20 may be moved from right to left and passed thereover and wedged over the shafts 15 and the end 21 of the bar 17.

It will be understood that the heads of the pin 16 and rivet 23 may be relatively smaller than as shown, and that suitable washers may be placed therebetween and the parts of the fish net adjacent thereto.

Other variations are possible, and parts of my invention may be used without other parts.

I do not, therefore, restrict myself to the details as shown in the drawing.

I claim as my invention and desire to secure by Letters Patent:

A folding fish landing net outfit comprising a frame, a net bag secured thereto, a handle bar pivotally connected at the inner end thereof to said frame, to be turned in a plane transversely to the plane of said frame, a pivot pin for said connection, the outer end of said bar extending in said transverse plane over and beyond the part of said frame which is remote from said pin when the net outfit is folded, said bar thereby being inclined to the plane of said frame when the said net outfit is folded, and substantially inelastic bands for securing the inner end of said bar to parts of said frame which are adjacent thereto, said bands being wedged on to said bar in its inclined position and to the said adjacent parts of said frame when the outfit is folded.

CHARLES J. GARRETT.